United States Patent
Rayfield et al.

(10) Patent No.: US 7,222,474 B2
(45) Date of Patent: May 29, 2007

(54) GROUND SENSING APPARATUS FOR A HEADER OF AN AGRICULTURAL HARVESTING MACHINE

(75) Inventors: James F. Rayfield, New Holland, PA (US); Gary L. Bich, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/118,564

(22) Filed: Apr. 29, 2005

(65) Prior Publication Data

US 2006/0242935 A1 Nov. 2, 2006

(51) Int. Cl.
*A01D 41/14* (2006.01)
*A01D 46/08* (2006.01)
*A01D 75/28* (2006.01)

(52) U.S. Cl. .................................. 56/10.2 E
(58) Field of Classification Search ..... 56/10.2 A–10.2 E, 10.2 R, 17.1, 17.2, 121.46, 51, 94, 73, 56/84, DIG. 3, DIG. 10; 172/2–8
See application file for complete search history.

(56) References Cited

U.S. PATENT DOCUMENTS

| | | | | |
|---|---|---|---|---|
| 3,196,599 A * | 7/1965 | Meiners et al. | ......... | 56/10.2 E |
| 3,611,681 A * | 10/1971 | Blanton | ......... | 56/10.4 |
| 3,643,407 A * | 2/1972 | Hubbard et al. | ......... | 56/10.2 E |
| 3,886,718 A | 6/1975 | Talbot | ......... | 56/208 |
| 3,953,959 A * | 5/1976 | Decruyenaere | ......... | 56/208 |
| 4,011,709 A | 3/1977 | Mott et al. | ......... | 56/10.4 |
| 4,199,925 A | 4/1980 | Quick et al. | ......... | 56/208 |
| 4,211,057 A * | 7/1980 | Dougherty et al. | ......... | 56/10.2 E |
| 4,229,931 A * | 10/1980 | Schlueter et al. | ......... | 56/10.2 E |
| 4,237,680 A | 12/1980 | Hoch et al. | ......... | 56/15.9 |
| 4,473,993 A | 10/1984 | Jennings et al. | ......... | 56/208 |
| 4,594,840 A | 6/1986 | D'Almeida et al. | ......... | 56/11.2 |
| 4,776,153 A | 10/1988 | DePauw et al. | ......... | 56/10.2 E |
| 4,800,711 A | 1/1989 | Hurlburt et al. | ......... | 56/219 |
| 4,809,487 A * | 3/1989 | Junge et al. | ......... | 56/10.2 E |
| 4,942,724 A * | 7/1990 | Diekhans et al. | ......... | 56/10.4 |
| 5,115,628 A * | 5/1992 | Garter et al. | ......... | 56/10.2 E |
| 5,155,984 A | 10/1992 | Sheehan | ......... | 56/10.2 E |
| 5,471,823 A * | 12/1995 | Panoushek et al. | ......... | 56/10.2 E |
| 5,713,190 A | 2/1998 | Vermeulin et al. | ......... | 56/10.2 E |
| 5,937,621 A * | 8/1999 | Eggenhaus | ......... | 56/10.2 E |
| 6,041,583 A * | 3/2000 | Goering et al. | ......... | 56/10.2 E |
| 6,202,395 B1 * | 3/2001 | Gramm | ......... | 56/10.2 E |
| 6,289,659 B1 * | 9/2001 | Fox | ......... | 56/10.2 E |
| 6,530,197 B1 | 3/2003 | Christensen et al. | ......... | 56/10.2 E |
| 6,588,187 B2 * | 7/2003 | Engelstad et al. | ......... | 56/10.2 E |
| 6,675,568 B2 | 1/2004 | Patterson et al. | ......... | 56/208 |
| 6,758,029 B2 * | 7/2004 | Beaujot | ......... | 56/10.2 E |
| 6,883,299 B1 * | 4/2005 | Gramm | ......... | 56/10.2 E |
| 2004/0006958 A1 * | 1/2004 | Thiemann et al. | ......... | 56/10.2 R |
| 2005/0028504 A1 * | 2/2005 | Gramm | ......... | 56/208 |

* cited by examiner

*Primary Examiner*—Árpád Fábián Kovács
(74) *Attorney, Agent, or Firm*—Michael G. Harms; John William Stader; Stephen A. Bucchianeri (57) ABSTRACT

Ground sensing apparatus for a header of an agricultural harvesting machine, configurable for sensing the ground with a cutter bar of the header in a fixed and/or raised position. The apparatus utilizes a linkage arrangement in connection with a sensor shaft and a skid shoe deployable to a lowered position and movable when in the lowered position for effecting rotations of the sensor shaft and thus signaling to an appropriate control, information relating to contact with the ground.

18 Claims, 6 Drawing Sheets

Fig. 5c

GROUND SENSING APPARATUS FOR A HEADER OF AN AGRICULTURAL HARVESTING MACHINE

TECHNICAL FIELD

This invention relates generally to ground sensing apparatus for an automatic height control and/or a tilt control of a header and/or a feeder for an agricultural harvesting machine such as a combine, and, more particularly, to ground sensing apparatus configurable for sensing the ground with a cutter bar of the header in a fixed and/or raised position, to enable use particularly of the automatic height control, as well as other controls which utilize ground contact information.

BACKGROUND ART

Some crops, particularly legumes such as soybeans, are desirably cut close to the ground, because some of the bean bearing pods are located there, and it is desirable to harvest as much of the crop as is practical. Other crops, particularly grasses such as wheat, oats, and barley, are desirably cut higher above the ground, for instance, at a height typically several inches above the ground, because the grain bearing heads are at the top of the plant. And, if the straw is not to be baled, it is typically desirable to cut at a higher height, to limit the amount of straw which is cut and inducted into the harvesting machine. For instance, if straw is not to be baled, it may be desirable to use a cutting height greater than about 7 inches above the ground, or, as another example, within a range of about 10 to 15 inches above the ground. Typically, when cutting crops such as soybeans close to the ground, the cutter bar is supported in a flex or floating mode wherein it is allowed to freely move vertically relative to the header within a limited range of travel. In contrast, at the higher cutting heights, the cutter bar is typically fixed to the header so as to be unable to flex or float.

To increase productivity, the trend has been toward the use of wider or longer headers such that more crops are harvested during each pass of a harvesting machine over a field. However, with the lengthening of the headers, for instance, to lengths of up to 40 feet, the risk of the header contacting the ground is increased, due to a variety of factors, particularly, unevenness of the ground. Currently, it is well known for a header to include an automatic header height control system which is used when the header is lowered to a lower cutting height for beans and the like, and the cutter bar in a flex or float mode. Generally, in operation, such control will use information relating to sensed contact with the ground to determine differences in level or slope of the ground, and irregularities of the ground surface, and automatically raise and lower the header for maintaining the cutter bar in desired relation to the ground, and for maintaining a desired down pressure on the cutter bar. Such systems typically utilize a side-by-side array of skid shoes or plates in connection with the floating cutter bar, which skid shoes extend just below the cutter bar for sensing or contacting the ground, and when one or more of the skid shoes contact the ground sufficiently to move the cutter bar upwardly, the cutter bar will at the same time provide inputs to the header height control system through a sensor, to enable the system to determine whether to raise or lower the header.

When the header is at a height for cutting grasses such as wheat, the cutter bar is located higher above the ground, and thus the array of skid shoes is also located above, and thus not in contact with, the ground, such that the automatic height control system is rendered ineffective. At such higher cutting heights, the cutter bar is typically fixed in a raised position so as not to flex or float, and to facilitate crop flow onto a lower pan of the header. As a result of the raised position of the cutter bar, if the automatic header height control is operational, false ground contact information may be provided to the control. As a result, the header height control is typically turned off or operated in a manner which disregards inputs resulting from the fixed cutter bar. However, even at such heights, as a result of the great widths or lengths of the headers and elevational variances in fields, it has been found that there still exists the possibility or danger of the header contacting the ground, particularly of the ends of the header contacting the ground. As a result, it would be desirable for the automatic header height control, and other controls which use such ground proximity information, to be operable with the header at such heights, for automatically adjusting the header height or other parameters for avoiding such contact. It would also be desirable to have a ground sensing capability which works at a greater distance below the cutter bar, for instance, about 5 or more inches therebelow.

Accordingly, what is sought is apparatus for enabling operation of an automatic header height control with a cutter bar fixed in position, such as when the header is positioned at a higher elevation such as for cutting grasses such as wheat, which provides one or more of the desired properties, and overcomes one or more of the problems, set forth above.

SUMMARY OF THE INVENTION

What is disclosed is ground sensing apparatus for a header of an agricultural harvesting machine, which enables operation of an automatic header height control when a cutter bar of the header is fixed in position, including when the header is positioned at a higher elevation such as cutting grasses such as wheat and the like, compared to lower elevations, such as for cutting soybeans, which apparatus provides one or more of the desired properties, and overcomes one of more of the problems, set forth above.

According to a preferred aspect of the invention, the ground sensing apparatus includes at least one sensor having an input in connection with a shaft such that rotation of the shaft will rotate the input for changing a state of the sensor. The apparatus includes a skid shoe supported on the header for upward and downward movement between at least a first ground sensing position wherein at least a portion of the skid shoe extends a first distance below a cutter bar of the header, and a second ground sensing position wherein at least a portion of the skid shoe extends a second distance below the cutter bar greater than the first distance. The skid shoe, when in at least the second ground sensing position, is movable upwardly as a result of contact with the ground. The apparatus further includes a linkage arrangement extending between the shaft and the skid shoe and configured such that when the skid shoe is moved upwardly from the second ground sensing position, the linkage arrangement will correspondingly or responsively rotate the shaft to effect a change in the state of the sensor. According to another preferred aspect of the invention, when in the first ground sensing position, the skid shoe extends downwardly to a location just below the level of the cutter bar, so as to be adapted for sensing the ground when the cutter bar is in a float or flex mode close to the ground such as for cutting legumes such as soybeans, and the second ground sensing position is at least about 5 inches below the first ground sensing position, so as to have utility when the header is fixed or locked up at a higher elevation, such as for harvesting grasses such as wheat.

According to another preferred aspect of the invention, the linkage arrangement of the apparatus includes an arm extending transversely from the shaft and rotatable therewith, and a link pivotally connected between the arm and the skid shoe when in the second ground sensing position, so as to be effective for rotating the arm and the shaft for changing the state of the sensor when the skid shoe is moved upwardly from that position. With the skid shoe in the first ground sensing position, the link is rendered ineffective for rotating the arm and the shaft for changing the state of the sensor. In this regard, it should be noted that other apparatus can be used or provided for allowing upward movements of the skid shoe to rotate the shaft when the skid shoe is in the first ground sensing position. Also preferably, with the skid shoe in the first ground sensing position, the linkage arrangement allows rotation of the shaft, for instance, by other skid shoes, without causing movement of the skid shoe. In contrast, the link is positioned in an angular orientation in relation to the arm by positioning of the skid shoe in the second ground sensing position, such that upward movements of the skid shoe will effect rotation of the arm and the shaft for changing the state of the sensor.

According to still another preferred aspect of the invention, the shaft includes at least one element separate from the linkage arrangement and operable for rotating the shaft by upward movement of the cutter bar for effecting a change of state of the sensor, and the linkage arrangement is configurable for rendering the element inoperable for this purpose.

Still further, the cutter bar is renderable operable in a flex mode wherein it is movable upwardly and downwardly in relation to the shaft, and in a fixed mode in fixed relation to the header and the shaft, and the skid shoe is supported on the cutter bar for pivotal movement between the first and second ground sensing positions and for upward movement from at least the second ground sensing position.

DETAILED DESCRIPTION OF THE INVENTION

Figure 1:
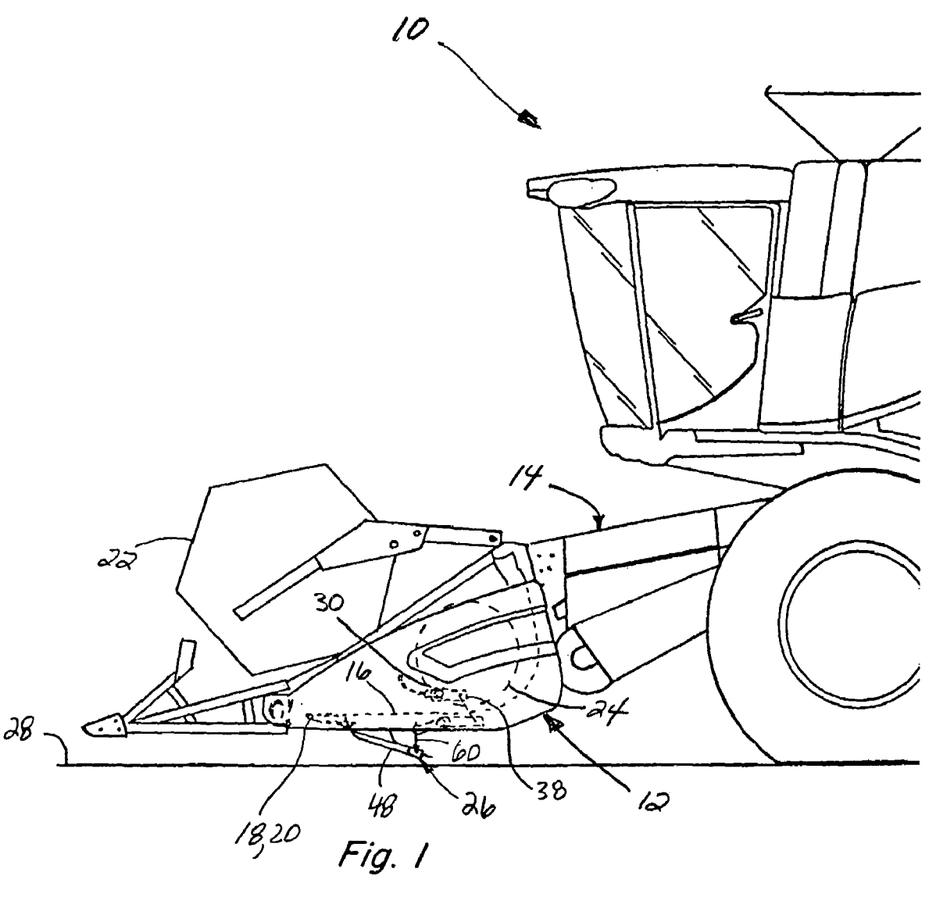
FIG. 1 is a side view of a front end of an agricultural combine having a header in a raised position above the ground with a cutter bar thereof in a fixed mode fixed in position on the header, the header including ground sensing apparatus according to the invention, a skid shoe of the ground sensing apparatus being shown in a lowered position for contacting the ground with the header raised.

Turning now to the drawings wherein a preferred embodiment of the invention is shown, in FIG. 1, a front end of a conventional, well known agricultural combine 10 is shown including a conventional header 12 supported on a feeder 14, for cutting or severing crops such as, but not limited to, legumes such as soybeans and small grains such as wheat, and inducting the severed crops into feeder 14 for conveyance into combine 10 for threshing and cleaning, in the well known manner as combine 10 moves forwardly over a field. Header 12 includes a bottom or pan 16 which is supported in desired proximity to the ground surface of the field during the harvesting operation, and an elongate, sidewardly extending cutter bar 18 supporting elongate, reciprocally movable sickle knives 20 disposed along a forward edge of pan 16 which sever the crop for induction into header 12. Header 12 additionally includes an elongate, sidewardly extending reel 22 disposed above pan 20–16 and rotatable in a direction for facilitating induction of the severed crops into header 12, and an elongate, rotatable auger 24 that extends in close proximity to a top surface of pan 16 and has spiral flights therearound (not shown) which convey the severed crops to feeder 14 for induction into combine 10. Header 12 is shown including ground sensing apparatus 26 constructed and operable according to teachings of the present invention, for sensing or contacting the ground surface of a field, herein generally referred to as ground 28, for providing information relating to contact with the ground to one or more controls of combine 10, such as a well known, conventional automatic header height control (not shown), a feeder height and/or angle control (also not shown), and/or a header tilt control (also not shown), in the well known, conventional manner.

Here, it should be noted that in FIG. 1, header 12 is shown at an elevated position above ground 28, wherein cutter bar 18 is fixed in position for severing crops at a desired height above ground 28, the height shown being intended to be representative of those typically used for harvesting grasses such as wheat, oats and barley. Such heights as illustrated in FIG. 1 will typically be 5 inches or more above ground 28, although it should be recognized and understood that ground sensing apparatus 26 has utility for use with header 12 positioned at any desired elevation above ground 28 at which a header such as header 12 is expected to be used.

Figure 1A:
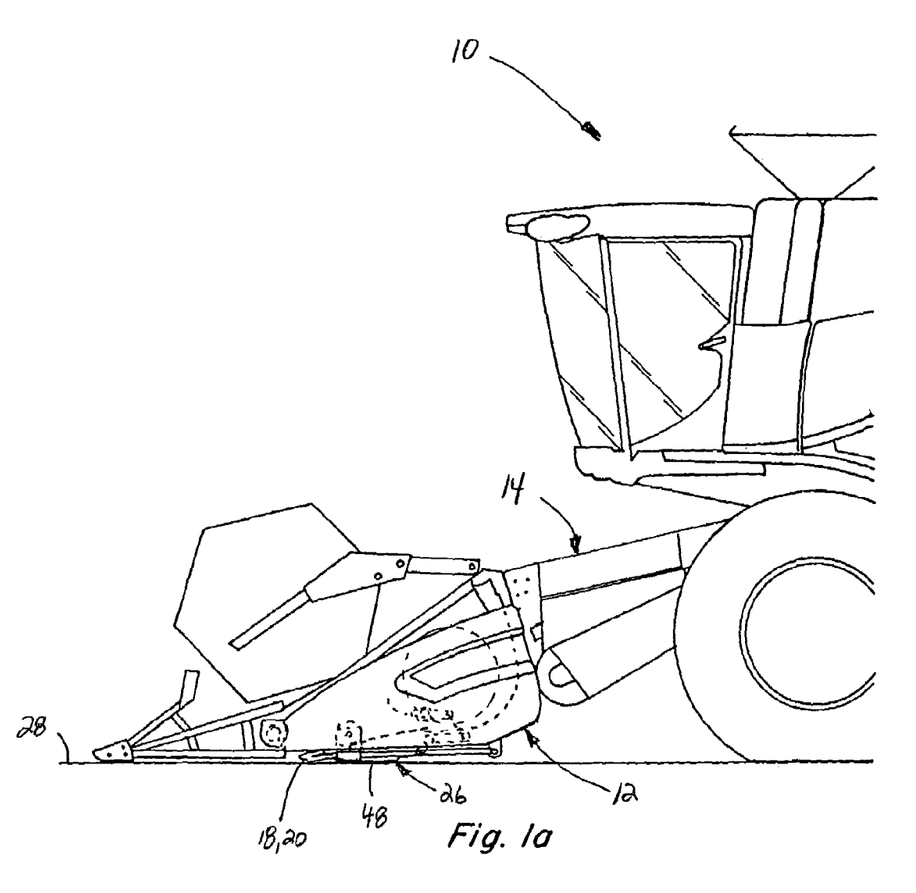
FIG. 1a is another side view of the front of the combine, showing the header in an alternative lowered position closer to the ground with a cutter bar thereof in a float mode, and the skid shoe of the apparatus in an alternative position for sensing the ground.

Referring also to FIG. 1a, that figure shows header 12 lowered to just above ground 28, for positioning cutter bar 18 just above ground level, which is a height typically utilized for cutting legumes, such as soybeans and the like. Here, it should be noted that typically, when a header, such as header 12, is operated at a height such as shown in FIG. 1a, cutter bar 18 is typically operated or supported in a flex or floating mode, wherein it is allowed to move vertically upwardly and downwardly relative to header 12 and pan 16 in response to contact with irregularities on or of ground 28, for purposes including to avoid cutter bar 18 and/or sickle knives 20 contacting or being driven into ground 28 and possibly being damaged thereby. To provide this capability, a cutter bar such as cutter bar 18 will typically include a plurality or array of side-by-side skid shoes extending along the width of a header and positioned just below the height of cutter bar 18, for contacting the ground such that the skid shoes and thus the cutter bar and structure supporting the cutter bar will be pushed upwardly by the contact. This upward movement will be sensed, to provide information to an automatic header height control, a feeder height and/or angle control, a header tilt control, and/or other control, which may result in some action by the control or controls, which in the instance of a header height control, can include automatically raising the header. Typically, the upward movement of a member supporting the cutter bar and skid shoes will cause rotation of a shaft in connection with an input of a sensor for changing an operating state of the sensor, as is well known.

According to teachings of the invention, ground sensing apparatus 26 additionally allows inputting information relating to ground contact when a cutter bar, such as cutter bar 18, is in fixed or non-float mode, such as is typical when a header such as header 12 is in a raised position such as shown in FIG. 1 for cutting grasses.

Figure 2:
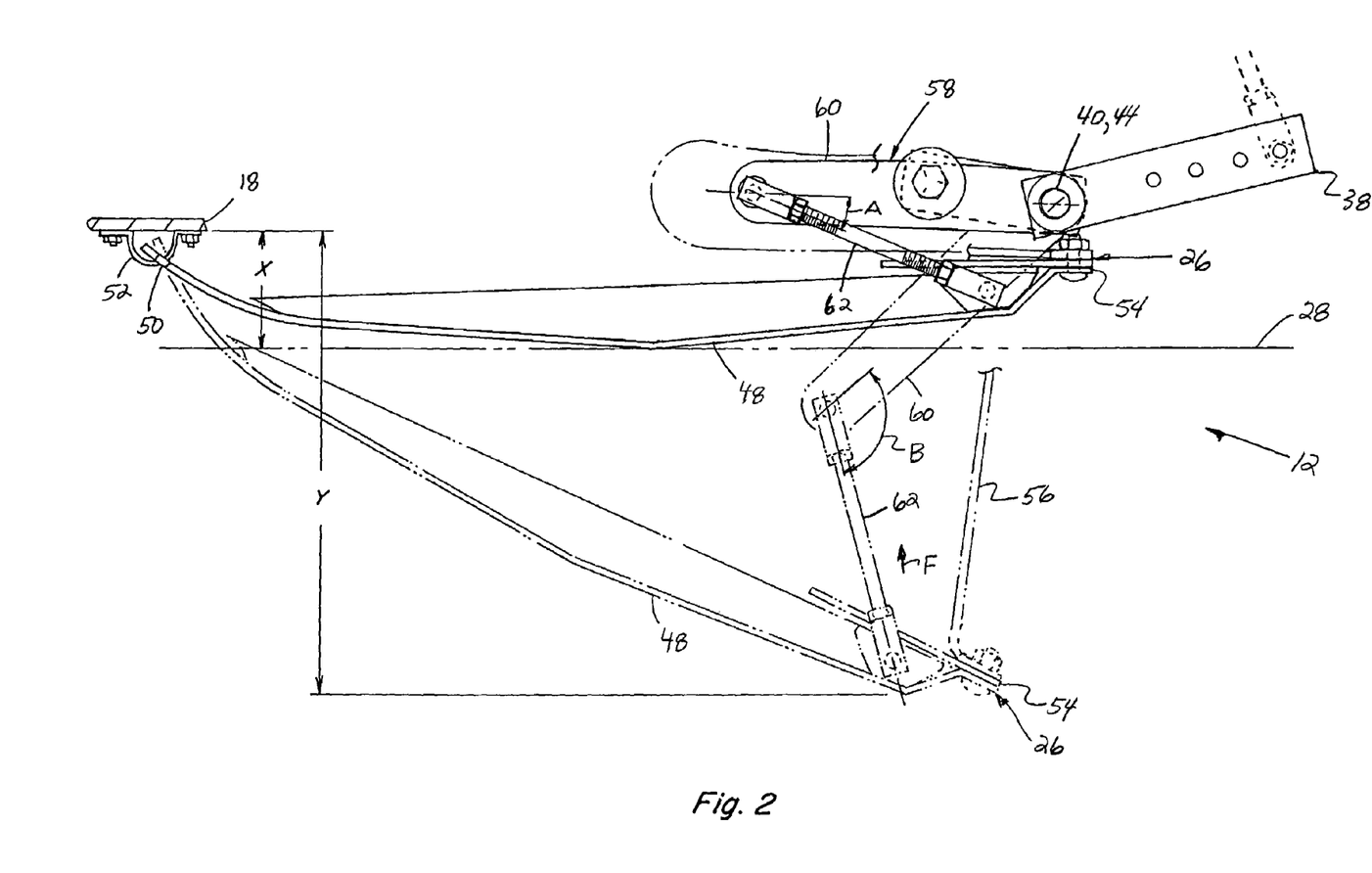
FIG. 2 is an enlarged, simplified side view of the apparatus of FIG. 1.
Figure 3:
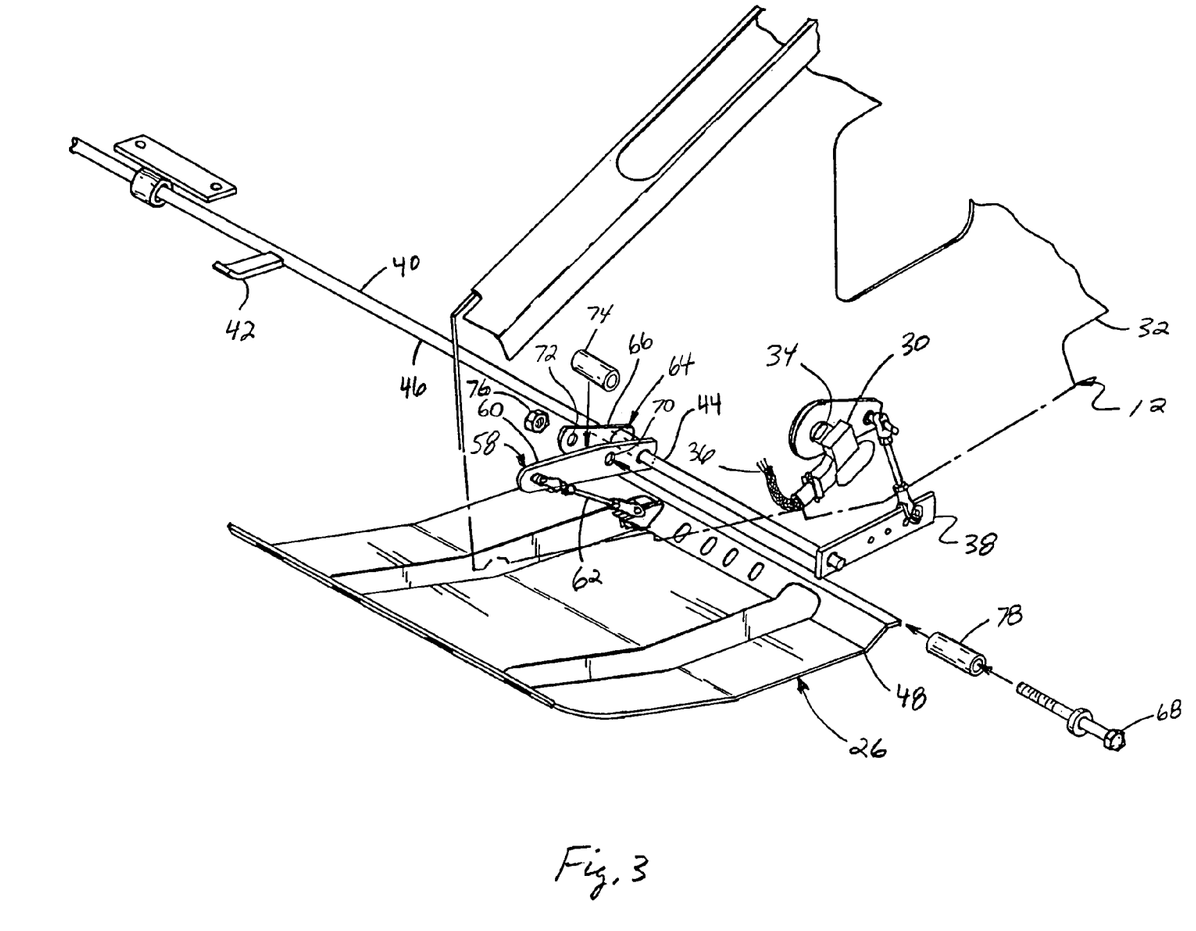
FIG. 3 is a simplified fragmentary exploded perspective view of the apparatus of FIG. 1.
Figure 4:
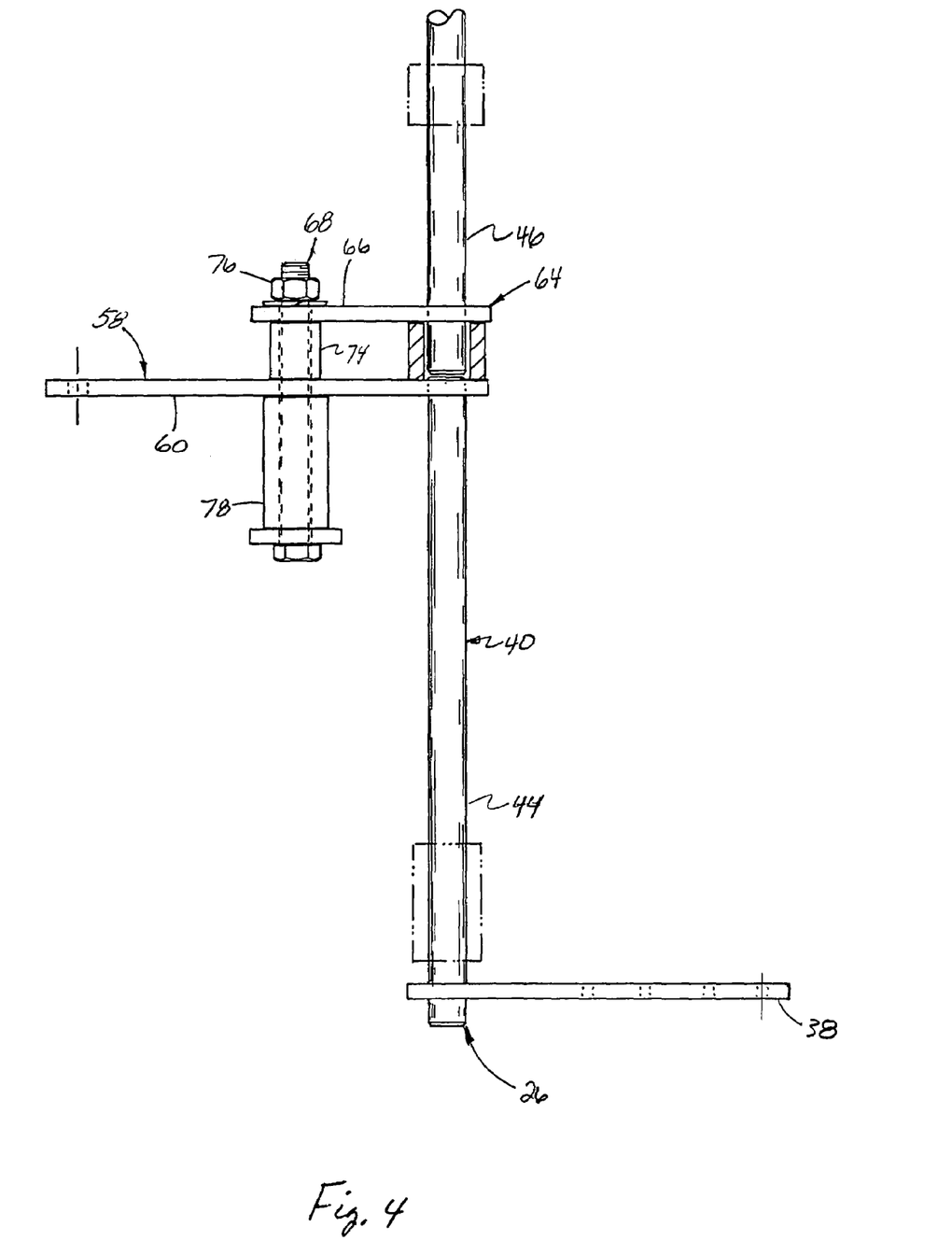
FIG. 4 is a simplified top view of elements of the apparatus of FIG. 1 in an assembled state.

Referring also to FIGS. 2, 3 and 4, a preferred embodiment of ground sensing apparatus 26 is shown. Ground sensing apparatus 26 includes a conventional sensor 30 which is mounted on a side sheet 32 or other suitable location on header 12. Sensor 30 includes an input 34 which is rotatable for changing an operating state of sensor 30, such as an electrical property, such as a voltage value, a current value, a resistance value, or a digital value, outputted by sensor 30 over a suitable conductive path, such as wire 36, to a control or other receiver, such as an automatic header height control (not illustrated), in the well known, conventional manner. Input 34 of sensor 30 is connected by a linkage mechanism 38 to a shaft 40 which extends along a least a portion of the sideward extent or width of header 12, such that rotation of shaft 40 about a longitudinal axis therethrough will cause rotation of input 32 of sensor 30, also in the well known, conventional manner. Still further in the well known manner, shaft 40 includes at least one transversely extending element 42 disposed along the length thereof in a position to be contacted by an element in connection with cutter bar 18 such as a cutter bar support arm (not shown) when the cutter bar is moved upwardly and downwardly relative to shaft 40 when the cutter bar is in the flex or float mode, for effecting rotation of shaft 40 and, through linkage mechanism 38, rotation of input 34 of sensor 30, for changing the operating state of sensor 30. As is explained next, ground sensing apparatus 26 additionally provides a ground sensing capability when cutter bar 18 is fixed.

Referring more particularly to FIG. 4, according to the present invention, shaft 40 is additionally divided into a first shaft segment 44 in connection with linkage mechanism 38, and a second shaft segment 46 in end-to-end relation with first shaft segment 44. As a result, first shaft segment 44 is capable of rotation independently of second shaft segment 46.

Referring more particularly to FIGS. 1, 1a and 2, apparatus 26 includes a skid shoe 48 supported on header 12 for upward and downward movement. Skid shoe 48 is movable between at least a first ground sensing position (FIG. 1a and in solid lines in FIG. 2) wherein at least a portion of skid shoe 48 extends a first distance below cutter bar 18 of header 12, denoted by representative distance X in FIG. 2, and a second ground sensing position (FIG. 1 and in phantom in FIG. 2) a second distance, denoted by distance Y in FIG. 2, below cutter bar 18, distance Y being greater than distance X. Preferably, as a representative value, distance Y will be at least about 5 inches greater than distance X. Here, skid shoe 48 has a front end 50 pivotally supported on cutter bar 18 of header 12 by a U-shaped strap 52. A rear end 54 of skid shoe 48 is shown supported at a desired height by a support 56, which can also be, for instance, a strap which can be flexible, a rigid sliding bracket, a chain, or other element which allows upward movement of skid shoe 48 but not downward movement below the desired height, at least when skid shoe 48 is in the second ground sensing position.

Also according to the invention, ground sensing apparatus 26 includes a linkage arrangement 58 disposed to extend between and operatively connect first segment 44 of shaft 40 and skid shoe 48 when in the second ground sensing position. Linkage arrangement 58 is preferably configured such that when skid shoe 48 is moved upwardly from the second ground sensing position (FIG. 1), linkage arrangement 58 will rotate segment 44 of shaft 40 to correspondingly rotate linkage mechanism 38 for rotating input 34 of sensor 30 for changing the operating state thereof, but will not do so when skid shoe 48 is moved upwardly from the first ground sensing position. This difference is desirable because it allows upward and downward movements of cutter bar 18, when in the float or flex mode, to cause rotations of shaft 40 in another manner, independent of linkage arrangement 58.

Referring more particularly to FIG. 2, to achieve this capability, linkage arrangement 58 preferably includes an arm 60 having a proximal end mounted on shaft segment 44 for rotation of arm 60 therewith, arm 60 extending transversely from shaft segment 44 to a distal end spaced therefrom. Linkage arrangement 58 includes a link 62 having one end pivotally connected to the distal end of arm 60, and an opposite end pivotally connected to skid shoe 48 adjacent rear end 54 thereof when skid shoe 48 is in the second ground sensing position. Link 62 can be optionally adjustable in length, to enable adjusting the angular relationship thereof with arm 60, and/or other parameters, as desired or required. When skid shoe 48 is in the first ground sensing position (FIGS. 1a and 2 in solid lines), arm 60 projects about horizontally from segment 44 of shaft 40, and link 62 is oriented at a small acute angle A of, for instance, about 20°, and is disconnected from skid shoe 48, such that the possible upward movements of skid shoe 48 with cutter bar 18 will be ineffectual for causing rotation of arm 60 and thus shaft segment 44 and linkage mechanism 38, such that no rotation of input 34 of sensor 30 or change of state thereof will occur. Again, as noted previously, such upward movements of skid shoe 48 with cutter bar 18, or upward movements of other skid shoes (not shown) of header 12 can cause rotation of shaft 40 and movement of linkage mechanism 38 for effecting a change of state of sensor 30, as desired or required, apart from the present invention. Likewise, such resultant rotational movements of shaft 40 will rotate arm 60 joined thereto, but will be ineffectual for causing any movement of skid plate 48, as link 62 is disconnected therefrom. In contrast, when skid plate 48 is lowered to the second ground sensing position extending the distance Y from cutter bar 18, link 62 is connected to skid plate 48 and is oriented at an angle B relative to arm 60, which here is about equal to 120 to about 130°, such that upward movements of skid shoe 48, denoted by arrow F, will cause upward movement of link 62 to rotate arm 60 and thus segment 44 of shaft 40 correspondingly, for rotating input 34 of sensor 30 via linkage mechanism 38, for effecting a change of state of sensor 30. Here, it should be noted that by movement of skid shoe 48 from the first ground sensing position to the second ground sensing position, shaft segment 44 will be rotated to a new position, so as to effect a rotational movement of input 34 of sensor 30, which can change a state of the sensor sufficiently to serve as an indication of deployment of skid shoe 48 to the lower ground sensing position. This information can be utilized as required or desired by a control, such as an automatic header height control.

Referring more particularly to FIGS. 3 and 4, it is contemplated that when a header such as header 12 is raised to a higher cutting position, such as illustrated in FIG. 1, ground sensing apparatus 26 will have utility at locations adjacent to the opposite ends of header 12. As a result, it is contemplated that skid shoes of a header other than those in the endmost positions, need not be deployable to a lower ground sensing position, such as the second ground sensing position shown in FIG. 1. Because usage of others of the skid shoes is not required, the portion or portions of shaft 40 rotated by upward movement of those skid plates, which here comprises second shaft segment 46, can be disconnected from first shaft segment 44 which is in connection with input 34 of sensor 30 via linkage mechanism 38. To accomplish this, shaft 40 includes a coupler 64 disposed between segments 44 and 46. Coupler 64 includes an arm 66 fixedly mounted to second shaft segment 46 for rotation therewith, which is alignable with arm 60 on first shaft segment 44, to allow rigid connection of arms 60 and 66 by a connecting bolt 68 connectable therebetween. Here, arm 60 includes a hole 70 therethrough, and arm 66 includes a hole 72 therethrough, holes 70 and 72 being alignable for insertion of bolt 68 therethrough with a spacer 74 disposed therebetween, and a nut 76 being threadedly engageable with bolt 68 for securing it in position connecting arms 60 and 66 for joint rotation. Here also, bolt 68 is shown passing through a sleeve 78. Sleeve 78 is positioned so as to be contactable by a cutter bar support arm (not shown) which extends rearwardly from the cutter bar to support structure therefor, and which is moved upwardly by upward movement of the cutter bar and the skid shoe, for effecting rotation of shaft 40 when the cutter bar is in the float or flex mode. Essentially, sleeve 78, when installed, and shaft segments 44 and 46 when thus connected, serves a similar function as transversely extending element 42, to provide a manner of rotating shaft 40 by upward movement of cutter bar 18 in the vicinity of skid shoe 48, when the cutter bar is in the flex or float mode.

Figure 5A:
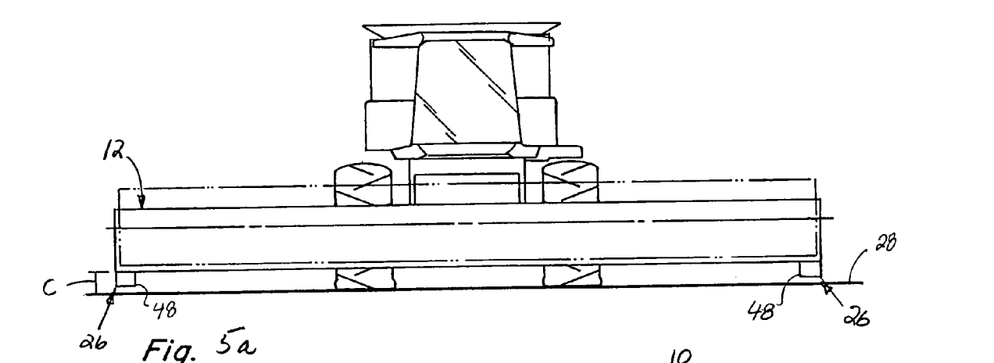
FIG. 5a is a simplified front view of the combine of FIG. 1, showing the header in a raised position over level ground with skid shoes of the apparatus in a lowered ground sensing position.
Figure 5B:
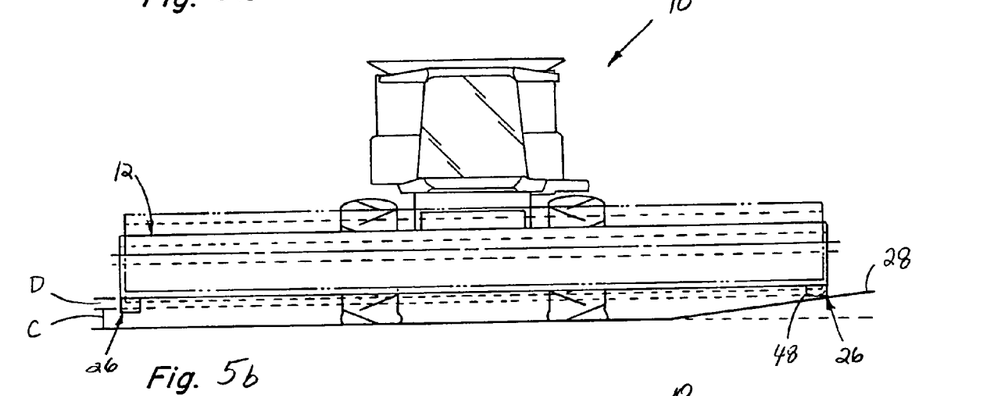
FIG. 5b is another front view of the combine, showing the header in the raised position over uneven ground such that one of the skid shoes is in contact with a raised portion of the ground.
Figure 5C:
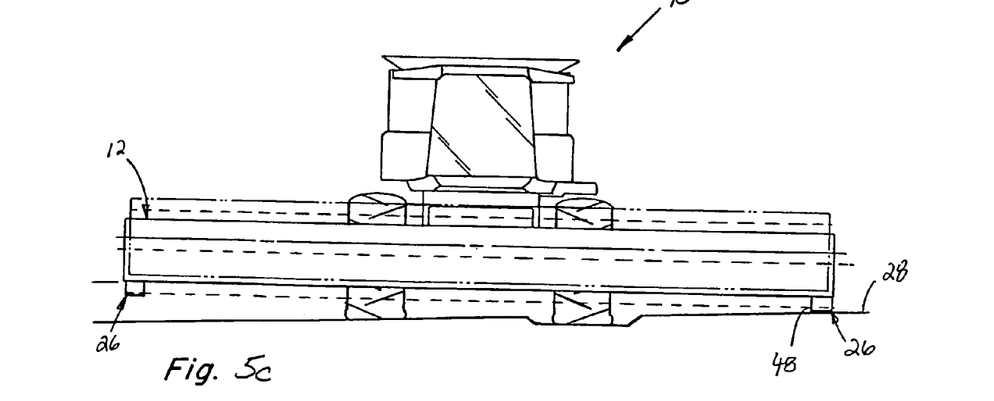
FIG. 5c is another front view of the combine with the header in a raised position and one wheel of the combine in a depression in the ground such that one of the skid shoes is brought into contact with the ground.

Referring also to FIGS. 5a, 5b and 5c, combine 10 is shown from the front in association with ground conditions illustrating the utility of ground sensing apparatus 26. Referring more particularly to FIG. 5a, header 12 of combine 10 is shown in an elevated position above ground 28, as denoted by height C. This height is similar to that shown in FIG. 1 and is suitable, for instance, for harvesting grasses such as wheat, barley and oats. Apparatus 26 of the invention are shown on opposite sides of header 12, but could alternatively be located on only one side, and/or at one or more additional locations along the length of header 12. Here, ground surface 28 is relatively flat, and skid shoes 48 of both apparatus 26 are shown elevated above ground 28.

Turning to FIG. 5b, header 12 is shown raised by a height D greater than height C above a flat portion of ground 28, as a result of contact of a skid shoe 48 of one of the ground sensing apparatus 26 with an elevated region of ground 28. Here, upward movement of skid shoe 48 as a result of contact with ground 28 would effect a change of state of a sensor in connection therewith in the above-described manner, which would signal a control, such as an automatic header height control and/or a feeder height or angle control, for effecting a raising of header 12 to a safe distance above the elevated region of ground 28, as illustrated.

Referring to FIG. 5c, one tire of combine 10 is shown in a depression in ground 28, to again bring a skid shoe 48 of one of apparatus 26 into contact with ground 28. This can also result in a raising of header 12 by an automatic header height control and/or a feeder height or angle control, as desired or required for maintaining header 12 at a specified minimum height above ground 28.

As a result of the illustrations referred to and the explanation herein, it should be apparent that apparatus 26 of the invention has utility for providing a ground sensing capability for a header, such as header 12, when a cutter bar, such as cutter bar 18, is fixed on the header, and the header is in a desired elevational position.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Ground sensing apparatus for a header of an agricultural harvesting machine, comprising:
    a shaft having a first segment coupled to a second segment by a coupler, wherein the coupler is configurable to allow the first segment to be connected and disconnected from the second segment;
    at least one sensor having an input connected to the first segment such that rotation of the shaft will rotate the input for changing a state of the sensor;
    a skid shoe supported on the header for upward and downward movement between at least a first ground sensing position wherein at least a portion of the skid shoe extends a first distance below a cutter bar of the header and a second ground sensing position wherein at least a portion of the skid shoe extends a second distance below the cutter bar greater than the first distance, the skid shoe when in at least the second ground sensing position being movable upwardly as a result of contact with the ground; and
    a linkage arrangement coupled between the first segment and the skid shoe and configured such that when the skid shoe is moved upwardly from the second ground sensing position the linkage arrangement will correspondingly rotate the shaft to effect a change in the state of the sensor.

2. Apparatus of claim 1, wherein the shaft includes at least one element operable for rotating the shaft by upward movement of the cutter bar for effecting a change of state of the sensor, and the linkage arrangement is configurable for rendering said element inoperable.

3. Apparatus of claim 1, wherein the second ground sensing position is at least 5 inches below the first ground sensing position.

4. Apparatus of claim 1, wherein the linkage arrangement includes an arm extending transversely from the shaft and rotatable therewith, and a link pivotally connectable between the arm and the skid shoe, the link being disconnected when the skid shoe is in the first ground sensing position such that upward movements of the skid shoe therefrom will be rendered ineffective for rotating the arm and the shaft for changing the state of the sensor, and the link being connected and positioned in a second angular orientation in relation to the arm by positioning of the skid shoe in the second ground sensing position such that upward movements of the skid shoe will effect rotation of the arm and the shaft for changing the state of the sensor.

5. Apparatus of claim 4, wherein the link is adjustable in length.

6. Apparatus of claim 1, further comprising a support coupled between the skid shoe and the header for supporting the skid shoe in at least the second ground sensing position while allowing upward movement of the skid shoe therefrom.

7. Apparatus of claim 1, wherein the skid shoe is pivotally movable between the first and second ground sensing positions.

8. Apparatus of claim 7, wherein the cutter bar is renderable in a flex mode wherein the cutter bar is movable upwardly and downwardly in relation to the shaft, and in a fixed mode in fixed relation to the header and the shaft, and the skid shoe is supported on the cutter bar for pivotal movement between the first and second ground sensing positions and for upward movement from at least the second ground sensing position.

9. Apparatus of claim 4, wherein the first segment is disconnected from the second segment in the second ground sensing position.

10. Ground sensing apparatus for a header of an agricultural harvesting machine, comprising:
  a shaft having a first segment coupled to a second segment in an end-to-end relation by a coupler, wherein the coupler is configurable to allow the first segment to be connected and disconnected from the second segment;
  at least one sensor having an input connected to the first segment such that rotation of the shaft will rotate the input for changing a state of the sensor;
  a skid shoe supported on the header for upward and downward movement between at least a first ground sensing position wherein at least a portion of the skid shoe extends a first distance below a cutter bar of the header and a second ground sensing position wherein at least a portion of the skid shoe extends a second distance below the cutter bar greater than the first distance, the skid shoe when in the ground sensing positions being movable upwardly relative to the shaft as a result of contacting the ground; and
  a linkage arrangement coupled between the first segment and the skid shoe and configurable such that upward movements of the skid shoe from the second ground sensing position will cause the linkage arrangement to rotate the shaft to change the state of the sensor, but upward movements of the skid shoe from the first ground sensing position will not cause the linkage arrangement to rotate the shaft to change the state of the sensor.

11. Apparatus of claim 10, wherein the shaft includes at least one element operable for rotating the shaft by upward movement of the cutter bar for effecting a change of state of the sensor, and the shaft is configurable for rendering said element inoperable.

12. Apparatus of claim 11, wherein the second ground sensing position is at least 5 inches below the first ground sensing position.

13. Apparatus of claim 10, wherein the linkage arrangement includes an arm extending transversely from the shaft and rotatable therewith, and a link pivotally connectable between the arm and the skid shoe when the skid shoe is in the second ground sensing position such that upward movements of the skid shoe therefrom will cause the link to rotate the arm and the shaft for changing the state of the sensor, and the link being disconnectable when the skid shoe is in the first ground sensing position such that upward movements of the skid shoe therefrom will be ineffectual for effecting changes of the state of the sensor through the linkage arrangement.

14. Apparatus of claim 13, wherein the link is adjustable in length.

15. Apparatus of claim 10, further comprising a support coupled between the skid shoe and the header for supporting the skid shoe in at least the second ground sensing position while allowing upward movement of the skid shoe therefrom.

16. Apparatus of claim 10, wherein the skid shoe is pivotally movable between the first and second ground sensing positions.

17. Apparatus of claim 16, wherein the skid shoe is pivotally mounted to the cutter bar.

18. Apparatus of claim 13, wherein the first segment is disconnected from the second segment in the second ground sensing position.

* * * * *